(12) United States Patent
Jamison et al.

(10) Patent No.: US 10,808,860 B2
(45) Date of Patent: Oct. 20, 2020

(54) LATCHING PNEUMATIC CONTROL VALVE

(71) Applicant: MAC Valves, Inc., Wixom, MI (US)

(72) Inventors: Michael Jamison, Fenton, MI (US);
Eric P. Janssen, Howell, MI (US);
Kevin C. Williams, Wixom, MI (US)

(73) Assignee: MAC Valves, Inc., Wixom, MI (US)

( * ) Notice: Subject to any disclaimer, the term of this patent is extended or adjusted under 35 U.S.C. 154(b) by 39 days.

(21) Appl. No.: 16/164,907

(22) Filed: Oct. 19, 2018

(65) Prior Publication Data

US 2019/0120402 A1  Apr. 25, 2019

Related U.S. Application Data

(60) Provisional application No. 62/576,257, filed on Oct. 24, 2017.

(51) Int. Cl.
*F16K 31/08* (2006.01)
*F16K 31/06* (2006.01)

(52) U.S. Cl.
CPC ........ *F16K 31/082* (2013.01); *F16K 31/0627* (2013.01); *F16K 31/084* (2013.01)

(58) Field of Classification Search
CPC ... F16K 31/0627; F16K 31/082; F16K 31/084
USPC .......................................... 137/625.2, 625.25
See application file for complete search history.

(56) References Cited

U.S. PATENT DOCUMENTS 5,010,911 A * 4/1991 Grant .................... F16K 31/082
137/68.3
9,010,373 B2 * 4/2015 Neff ..................... F16K 31/0627
137/625.64
2002/0079005 A1 6/2002 Yoshida et al.
2014/0261804 A1 9/2014 Neff et al.

FOREIGN PATENT DOCUMENTS

DE   102013017259 A1   4/2015
EP       3181968 A1   6/2017

OTHER PUBLICATIONS

International Search Report for European Application No. EP 18 20 2410, dated Mar. 12, 2019.
European Examination Report dated Mar. 16, 2020 in corresponding European Application No. 18202410.9.

* cited by examiner

*Primary Examiner* — Umashankar Venkatesan
(74) *Attorney, Agent, or Firm* — Harness, Dickey & Pierce, P.L.C.

(57) ABSTRACT

A control valve having a valve body, seat member, valve member, and solenoid including a housing, bobbin, and coil. The valve member has a head portion disposed within the bobbin and a valve portion, disposed within the valve body, that has a seat engagement member operating to open and close ports in the valve body when the valve member slides between first and second positions. A permanent magnet, disposed within the bobbin, applies an attractive force of variable magnitude to the valve member in a direction opposing a biasing force created by a biasing component. Pulses of electric current applied to the coil change the variable magnitude. The permanent magnet pulls the valve member to the second position when the attractive force is greater than the biasing force and the valve member returns to the first position when the attractive force is less than the biasing force.

20 Claims, 4 Drawing Sheets

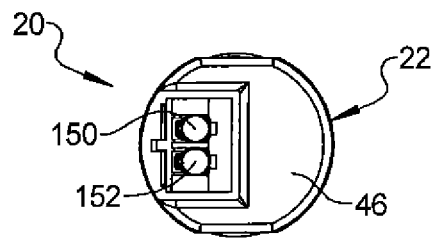
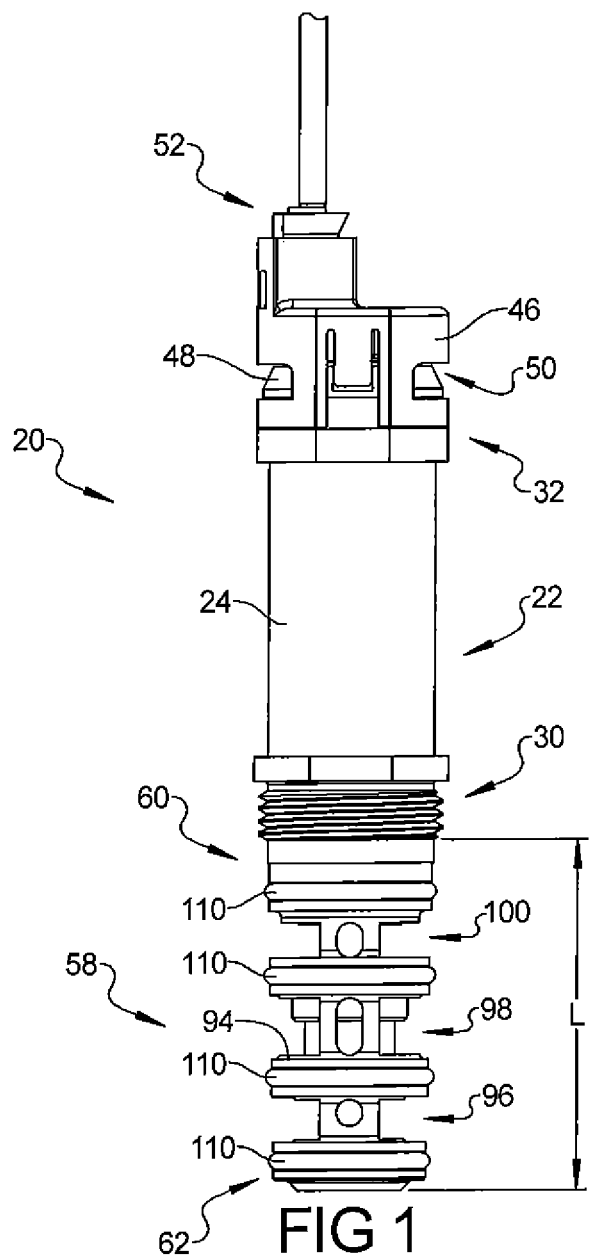

LATCHING PNEUMATIC CONTROL VALVE

CROSS-REFERENCE TO RELATED APPLICATIONS

This application claims the benefit of U.S. Provisional Application No. 62/576,257, filed on Oct. 24, 2017. The entire disclosure of the application referenced above is incorporated herein by reference.

FIELD

The present disclosure relates to control valve assemblies. More particularly, the present disclosure relates to self-latching solenoid actuated valve assemblies, which may find use in various applications including, without limitation, pneumatics.

BACKGROUND

This section provides background information related to the present disclosure which is not necessarily prior art.

Solenoids are well known electromechanical devices used to convert electrical energy into mechanical energy and particularly into short stroke mechanical motion. As such, solenoids have long been employed to actuate valves in response to an electrical signal. For example, it is known in the related art to employ a solenoid to move a valve member in an actuation direction against the biasing force of a return spring. When electrical power is supplied to a coil in the solenoid, a magnetic field is created in the solenoid that moves the valve member from a rest position to an actuated position. When electrical power to the solenoid is interrupted, the return spring biases the valve member back to the rest position. However, this approach suffers from the disadvantage that the coil of the solenoid must remain powered at all times to hold the valve member in the actuated position against the biasing force of the return spring. Unexpected, inadvertent, or even planned interruption of electrical power to the coil results in return of the valve member to the rest position, regardless of whether that is desired or not. In applications where the power consumption of the solenoid is of concern, such as where there is a limited source of electrical power (e.g. battery powered valves), solenoids that must be continually powered to hold the valve member in the actuated position are not desirable. Additionally, significant heat build-up can occur in solenoids that must be continually powered to hold the valve member in the actuated position.

To decrease the power consumption of a solenoid and heat build-up, particularly in applications where the solenoid is to be retained in the actuated position for significant time periods, permanent magnets (PM) have been used to hold the mechanical output of the solenoid in one position or the other without requiring continuous power to the coil of the solenoid. Conventional self-latching solenoids known in the related art typically employ a sliding push pin and a fixed permanent magnet, which can be latched or un-latched by a pulse of electric current. Electrical current flowing through the coil of the solenoid in one direction increases (i.e., strengthens) the attractive force of the permanent magnet and causes the permanent magnet to repel the push pin and push it against the valve member in opposition to the biasing force of the return spring. The return spring biases the valve member in the opposite direction when electrical current flows through the coil of the solenoid in a reverse direction that reduces (i.e., weakens) the attractive force of the permanent magnet. In this way, the valve member may be moved to, and maintained in, any predetermined position by actuation of the solenoid after a relatively short pulse of electrical current flows through the coil of the solenoid. After the attractive force of the permanent magnet has been increased (i.e., strengthened) or reduced (i.e., weakened), electrical power can be switched off and the valve member will remain in its current position, whether that is the actuated position or the rest position. While the self-latching solenoid actuated valves are known in the related art, there continues to be a need for improved self-latching solenoid actuated valves. This is especially true for small pneumatic valves.

SUMMARY

This section provides a general summary of the disclosure, and is not a comprehensive disclosure of its full scope or all of its features.

The subject disclosure describes an improved latching control valve assembly. The latching control valve assembly has a solenoid including a housing, a bobbin, and a coil. The bobbin is disposed within the housing and a coil extends around the bobbin. The housing extends longitudinally between a first housing end and a second housing end and the bobbin defines a solenoid bore that extends along a longitudinal axis. The latching control valve assembly also includes a valve body, a seat member, and a valve member. The valve body extends longitudinally from the first housing end of the solenoid. The valve body defines a valve body bore and the seat member is disposed within the valve body bore. The valve member has a head portion that is slidingly disposed within the solenoid bore and a valve portion that is slidingly disposed within the valve body bore. The valve portion of the valve member has a seat engagement member that extends outwardly to engage the seat member during sliding motion of the valve member in the solenoid bore and the valve body bore. The valve member slides within the solenoid bore and the valve body bore between a first position where the seat engagement member is displaced away from the first housing end of the solenoid and a second position where the seat engagement member is displaced towards the first housing end of the solenoid. The valve body includes a ported face. The seat engagement member operates to open and close one or more ports in the ported face of the valve body when the valve member slides longitudinally between the first and second positions. A biasing component operates to apply a biasing force to the valve member. The biasing force biases the valve member toward the first position. A permanent magnet is disposed at least partially within the solenoid bore. The permanent magnet has a magnetic field and operates by applying an attractive force to the valve member. The attractive force generated by the permanent magnet points towards the second housing end of the solenoid such that the attractive force of the permanent magnet opposes the biasing force of the biasing component. A pole piece is also disposed within the solenoid bore. The pole piece is positioned longitudinally in the solenoid bore between the permanent magnet and the head portion of the valve member. The attractive force of the permanent magnet has a variable magnitude. When the coil of the solenoid receives a pulse of electric current in a specific polarity, the variable magnitude of the attractive force generated by the permanent magnet changes. The attractive force of the permanent magnet operates to displace the valve member towards the second position when the variable magnitude of the attractive force is greater than the biasing force of the biasing component. On the other hand, the biasing force of the biasing component operates to displace the valve member towards the first position when the variable magnitude of the attractive force is less than the biasing force of the biasing component. This is accomplished by reversing the polarity of the pulse of current applied to the coil of the solenoid.

The attractive force of the permanent magnet in the latching control valve assembly disclosed herein acts on the valve member itself, pulling the valve member towards the pole piece. Advantageously, this eliminates the need for the sliding push pin of conventional self-latching solenoid actuated valves. The subject design also eliminates the need to position the biasing component at a distal end of the valve body, reducing the length of the valve body. This means that the latching control valve assembly disclosed herein requires a shallower cavity in the valve manifold into which it is installed, providing for a more compact and efficient use of space. At the same time, the latching control valve assembly disclosed herein retains the benefits associated with self-latching solenoid actuated valves, including significantly reduced power consumption and heat build-up as compared to traditional solenoid actuated valves. This makes the latching control valve assembly disclosed herein a suitable candidate for battery powered applications and/or applications where the solenoid must hold the valve member in an actuated position for long time periods.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a side elevation view of an exemplary latching control valve assembly constructed in accordance with the subject disclosure;

FIG. 2 is a top elevation view of the exemplary latching control valve assembly illustrated in FIG. 1;

DETAILED DESCRIPTION

Figure 3:
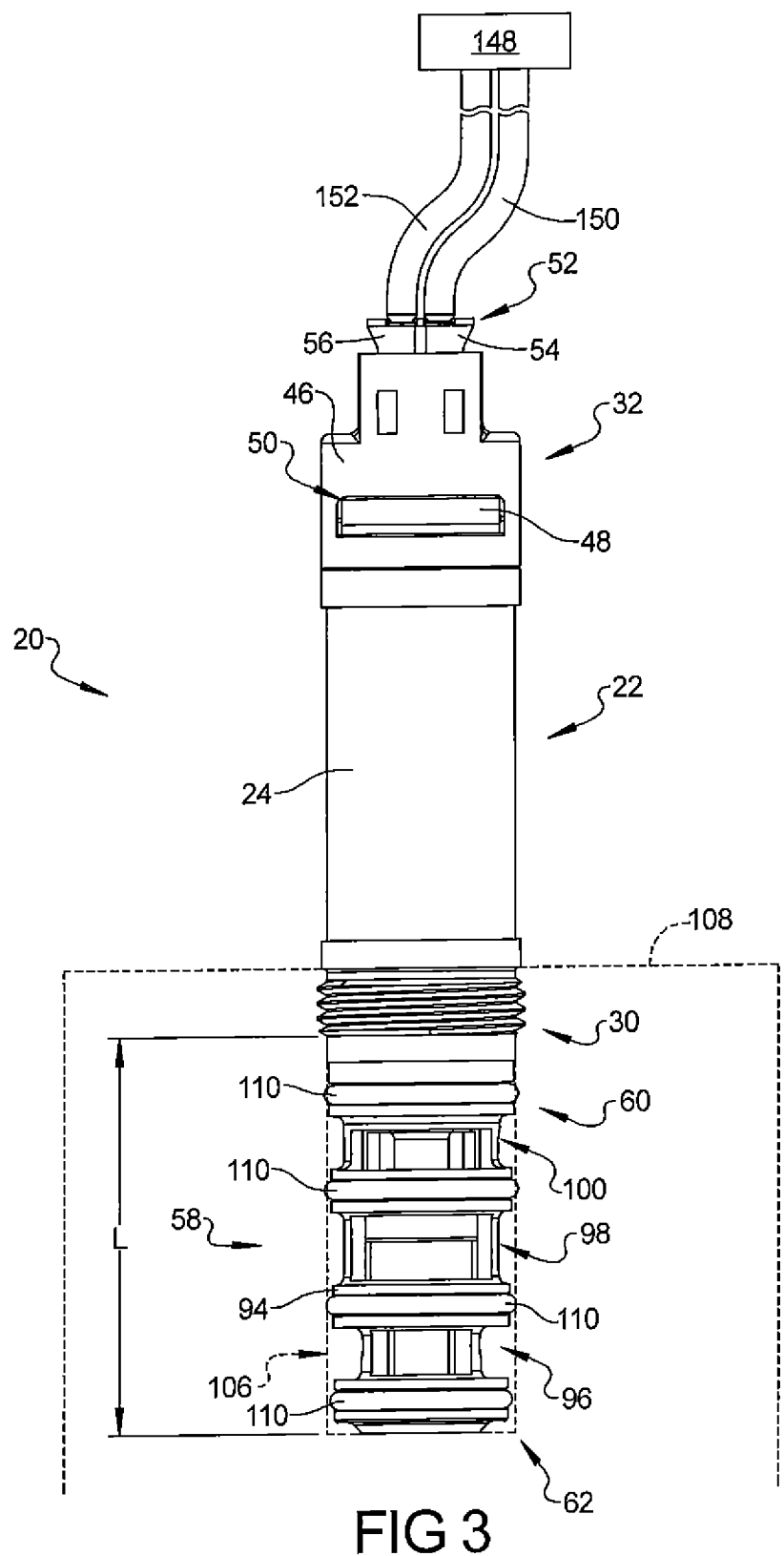
FIG. 3 is a front elevation view of the exemplary latching control valve assembly illustrated in FIG. 1 and an exemplary valve manifold for receiving the exemplary latching control valve assembly illustrated in FIG. 1.

Referring to the Figures, wherein like numerals indicate corresponding parts throughout the several views, a latching control valve assembly 20 is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "interior," "exterior," "beneath", "below", "lower", "above", "upper", "proximal", "distal", "inboard", "outboard" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. The terms "longitudinal" and "longitudinally" means alignment in a direction that is along or parallel to the longitudinal axis described below. The terms "threadably engages" and "threadably engaged" describes an interface between two components where male and female threads mate and hold the two components together.

With reference to FIGS. 1-5, the latching control valve assembly 20 disclosed herein includes a solenoid 22. The solenoid 22 has a housing 24, a bobbin 26, and a coil 28. The bobbin 26 is disposed within the housing 24 and the coil 28 is disposed radially between the bobbin 26 and the housing 24. The housing 24 of the solenoid 22 extends longitudinally between a first housing end 30 and a second housing end 32. The bobbin 26 includes an exterior surface 34 and an interior surface 36. The interior surface 36 of the bobbin 26 defines a solenoid bore 38 that extends along a longitudinal axis 40. The coil 28 includes windings 42 of a conductive wire that extend about the exterior surface 34 of the bobbin 26. In the embodiment shown, the windings 42 of the coil 28 are wound in a clockwise direction about the bobbin 26 when viewed from a point 44 disposed along the longitudinal axis 40 adjacent the second housing end 32 (i.e. when the solenoid 22 is viewed from above, as shown in FIG. 2). It should be appreciated that the coil 28 may be wound in a counter-clockwise direction about the bobbin 26; however, other corresponding changes to the latching control valve assembly 20 would have to be made, which will be described below. The conductive wire of the windings 42 may be made from a variety of different materials. By way of example and without limitation, the conductive wire of the windings 42 may be made of an enamel coated copper (Cu). It should also be appreciated that the housing 24 and the bobbin 26 may have a variety of different shapes without departing from the scope of the subject disclosure. By way of non-limiting example, the housing 24 and the bobbin 26 may generally be cylindrical in shape as shown in the appended figures.

The latching control valve assembly 20 illustrated in FIGS. 1-5 includes an end cap 46 that is retained on the second housing end 32 of the solenoid 22. The end cap 46 may be fastened to the housing 24 of the solenoid 22 in a variety of different ways. In the illustrated example, the end cap 46 is secured to the second housing end 32 of the solenoid 22 by snap elements 48. The snap elements 48 have a ramped shape and snap into openings 50 in the end cap 46 to hold the end cap 46 in place. The latching control valve assembly 20 also includes at least two electrical connectors 52 that are electrically connected to the coil 28 of the solenoid 22. For example, the at least two electrical connectors 52 may include a first terminal 54 and a second terminal 56. The first and second terminals 54, 56 may have a variety of different shapes and configurations. In the illustrated example, the first and second terminals 54, 56 are electrically conductive pins that extend longitudinally outward from the second housing end 32 and through the end cap 46.

The latching control valve assembly 20 also includes a valve body 58. The valve body 58 extends longitudinally from the first housing end 30 and has a proximal end 60, a distal end 62, and a length L that is measurable between the proximal end 60 and the distal end 62 of the valve body 58. The proximal end 60 of the valve body 58 is disposed adjacent to the first housing end 30 and the distal end 62 of the valve body 58 is longitudinally spaced away from the first housing end 30. The proximal end 60 of the valve body 58 is attached to the first housing end 30 of the solenoid 22. By way of example and without limitation, the proximal end 60 of the valve body 58 may be threadably engaged with the first housing end 30 of the solenoid 22.

Figure 4:
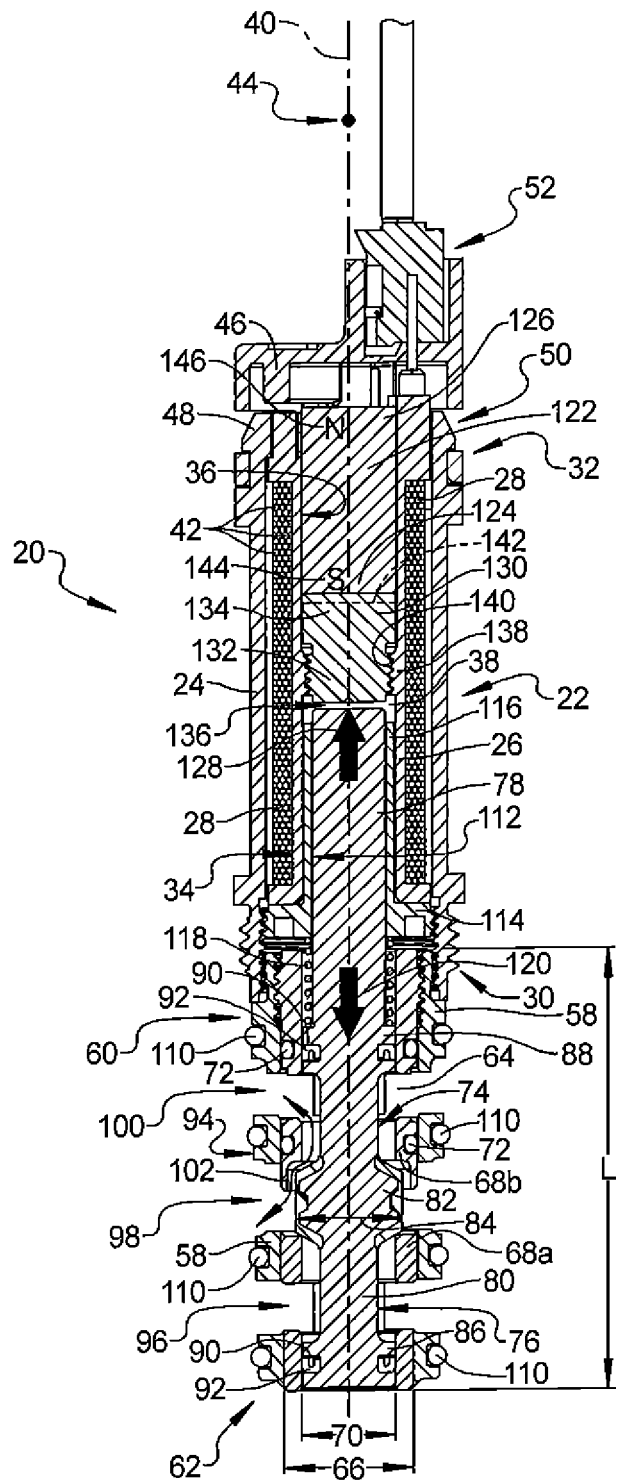
FIG. 4 is a side cross-sectional view of the exemplary latching control valve assembly illustrated in FIG. 1 where the valve member is shown in a first position.
Figure 5:
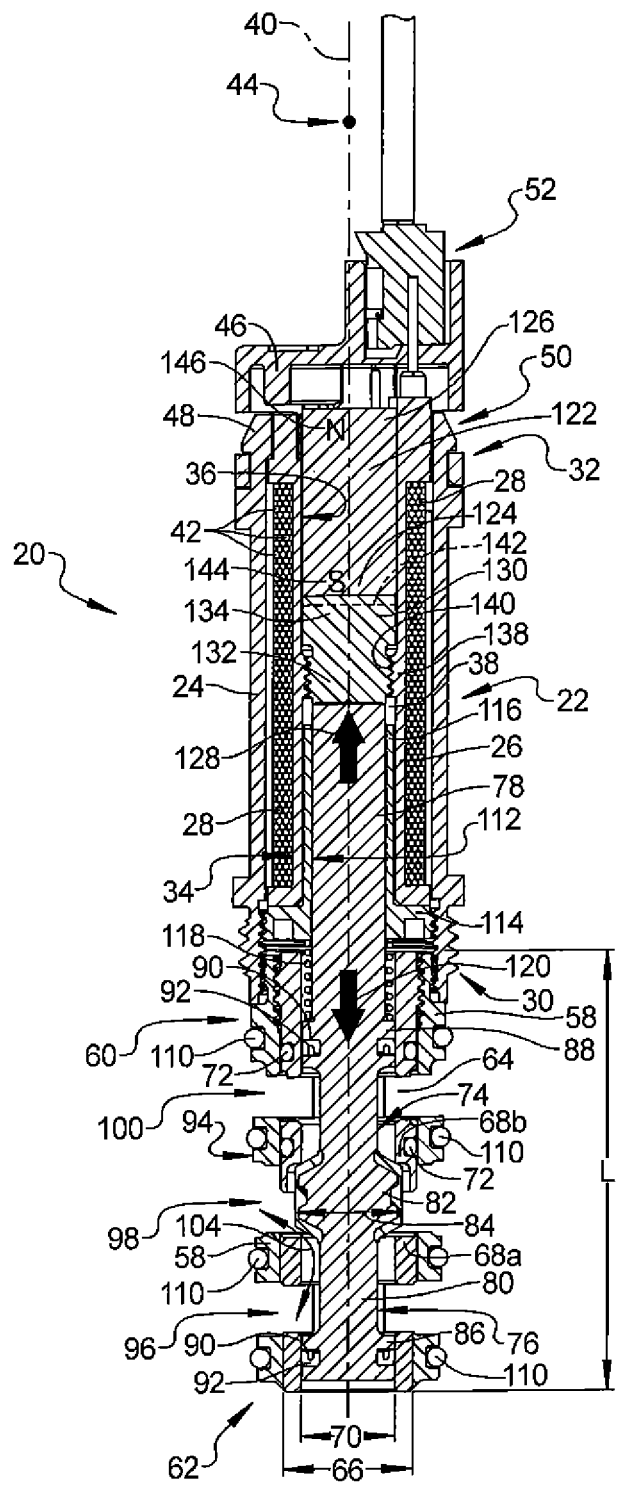
FIG. 5 is another side cross-sectional view of the exemplary latching control valve assembly illustrated in FIG. 1 where the valve member is shown in a second position.

As best seen in FIGS. 4 and 5, the valve body 58 defines a valve body bore 64 that is oriented coaxially with the longitudinal axis 40 of the solenoid bore 38. The valve body bore 64 has a bore diameter 66, which extends across the valve body bore 64 in a direction that is transverse to the longitudinal axis 40. One or more seat members 68a, 68b are disposed within the valve body bore 64. While other configurations are possible, the seat members 68a, 68b in the illustrated example extend into and are threadably engaged with the valve body bore 64. The seat members 68a, 68b may be cylindrical in shape and have an internal diameter 70, which extends across the seat members 68a, 68b in a direction that is transverse to the longitudinal axis 40. The seat members 68a, 68b may also include seals 72 that seal the seat members 68a, 68b within the valve body bore 64 to prevent fluid leaks within the valve body bore 64 between the seat members 68a, 68b and the valve body 58.

The latching control valve assembly 20 includes a valve member 74 that is oriented coaxially with the longitudinal axis 40. The valve member 74 has an outer surface 76, a head portion 78, and a valve portion 80. As shown in FIGS. 4 and 5, the valve member 74 is a single-piece component where the head portion 78 and the valve portion 80 of the valve member 74 are integral with each other. The head portion 78 is slidingly disposed within the solenoid bore 38 and the valve portion 80 is slidingly disposed within the valve body bore 64 such that the valve member 74 can translate longitudinally between a first position (FIG. 4) and a second position (FIG. 5). Along the head portion 78, the outer surface 76 of the valve member 74 faces and is arranged in a slip fit with the interior surface 36 of the bobbin 26. Optionally, the outer surface 76 of the valve member 74 may have a cylindrical shape along the head portion 78.

The valve portion 80 of the valve member 74 includes a seat engagement member 82 that extends radially outwardly to engage the seat members 68a, 68b during sliding motion of the valve member 74 in the valve body bore 64. The seat engagement member 82 may have a circular cross-sectional shape and may define an outer diameter 84, which extends across the seat engagement member 82 in a direction that is transverse to the longitudinal axis 40. As shown in FIG. 4, when the valve member 74 slides to the first position, the seat engagement member 82 is displaced away from the first housing end 30 of the solenoid 22. As shown in FIG. 5, when the valve member 74 slides to the second position, the seat engagement member 82 is displaced towards the first housing end 30 of the solenoid 22. The seat engagement member 82 may be made from a variety of different materials. For example and without limitation, at least part of the seat engagement member 82 may be made of a resilient material, such as rubber. The valve portion 80 of the valve member 74 may also have a variety of different shapes. For example, the valve portion 80 of the valve member 74 may have a poppet valve shape (illustrated) or a spool valve shape (not shown). When the valve portion 80 of the valve member 74 is configured as a poppet valve, the outer diameter 84 of the seat engagement member 82 is greater than the internal diameter 70 of the seat members 68a, 68b. When the valve portion 80 of the valve member 74 is configured as a spool valve, the outer diameter 84 of the seat engagement member 82 approximately equals the internal diameter 70 of the seat members 68a, 68b.

The valve portion 80 of the valve member 74 may also include a first piston 86 adjacent the distal end 62 of the valve body 58 and a second piston 88 adjacent the proximal end 60 of the valve body 58. The first and second pistons 86, 88 operate to seal against the seat members 68a, 68b. Optionally, the first and second pistons 86, 88 may have substantially equal diameters such that a pressurized fluid acting oppositely against the first and second pistons 86, 88 results in balanced pressure forces acting on the valve member 74. Such a configuration is sometimes described as a pressure balanced valve. Each of the first and second pistons 86, 88 may include an annular groove 90 and a resilient piston seal 92 disposed in the annular groove 90 that slidably and sealingly engages the seat members 68a, 68b with a close tolerance fit to prevent fluid leaks in the valve body bore 64 between the first and second pistons 86, 88 and the seat members 68a, 68b.

The valve body 58 includes a ported face 94, a first port 96, a second port 98, and a third port 100. The first port 96 extends through the valve body 58 from the valve body bore 64 to the ported face 94 and is positioned within the valve body 58 adjacent to the distal end 62. The second port 98 extends through the valve body 58 from the valve body bore 64 to the ported face 94 and is positioned longitudinally between the first and third ports 96, 100. The third port 100 extends through the valve body 58 from the valve body bore 64 to the ported face 94 and is positioned within the valve body 58 adjacent to the proximal end 60. The first port 96 and the third port 100 are longitudinally positioned on opposite sides of the seat engagement member 82 of the valve member 74. When the valve member 74 is in the first position (FIG. 4), the seat engagement member 82 contacts and seals against seat member 68a to close the first port 96 and open the third port 100. Thus, a first fluid flow path 102 is created when the valve member 74 is in the first position where fluid can flow through the valve body bore 64 from the second port 98 to the third port 100 or from the third port 100 to the second port 98. When the valve member 74 is in the second position (FIG. 5), the seat engagement member 82 contacts and seals against seat member 68b to open the first port 96 and close the third port 100. Thus, a second fluid flow path 104 is created when the valve member 74 is in the second position where fluid can flow through the valve body bore 64 from the first port 96 to the second port 98 or from the second port 98 to the first port 96.

With reference to FIG. 3, the ported face 94 of the valve body 58 is configured to be received in a cavity 106 of a valve manifold 108. In the illustrated example, the valve body 58 is threadably engaged in the cavity 106 of the valve manifold 108; however, the valve body 58 may be secured to the valve manifold 108 by alternative structure. The valve body 58 may also include a-rings 110 that seal the valve body 58 within the cavity 106 in the valve manifold 108 to prevent fluid leaks within the cavity 106 between the valve body 58 and the valve manifold 108. The valve manifold 108 may include one or more fluid passageways (not shown) that communicate fluid to or from the first, second, and third ports 96, 98, 100 in the valve body 58. For example and without limitation, the valve manifold 108 may be configured such that the first port 96 in the valve body 58 operates as an inlet port that receives fluid, the second port 98 operates as an outlet port that discharges fluid, and the third port 100 operates as an exhaust port that also discharges fluid.

With reference to FIGS. 4 and 5, the latching control valve assembly 20 may also include a bushing 112 disposed within the housing 24 of the solenoid 22. The bushing 112 may include a flange portion 114 positioned within the first housing end 30 and a neck portion 116 that extends into the solenoid bore 38 such that the neck portion 116 is positioned radially between the head portion 78 of the valve member 74 and the bobbin 26. While other configurations are possible, the flange portion 114 of the bushing 112 threadably engages the first housing end 30 and the neck portion 116 of the bushing 112 is cylindrical in shape in the illustrated example. The latching control valve assembly 20 also includes a biasing component 118 that is positioned longitudinally between the second piston 88 of the valve member 74 and the flange portion 114 of the bushing 112. The biasing component 118 operates to apply a biasing force 120 to the valve member 74. The biasing force 120 generated by the biasing component 118 points towards the distal end 62 of the valve body 58 and therefore biases the valve member 74 toward the first position. Although the biasing component 118 may take several forms, the biasing component 118 in the illustrated example is a compression spring that extends helically/annularly about the head portion 78 of the valve member 74.

The latching control valve assembly 20 further includes a permanent magnet 122 that is disposed within the second housing end 32 of the solenoid 22. The permanent magnet 122 has an inboard end 124 that faces the head portion 78 of the valve member 74 and an outboard end 126 that faces the end cap 46. In the illustrated example, the permanent magnet 122 is disposed entirely within the solenoid bore 38; however, in other embodiments the permanent magnet 122 may only partially extend into the solenoid bore 38 with portions of the permanent magnet 122 positioned outside the solenoid bore 38. In operation, the permanent magnet 122, sometimes abbreviated PM, can selectively generate a magnetic field and apply an attractive force 128 to the valve member 74. The attractive force 128 that is generated by the permanent magnet 122 points towards the second housing end 32 of the solenoid 22 such that the attractive force 128 of the permanent magnet 122 opposes the biasing force 120 of the biasing component 118.

The latching control valve assembly 20 also includes a pole piece 130 disposed within the solenoid bore 38 and positioned longitudinally between the inboard end 124 of the permanent magnet 122 and the head portion 78 of the valve member 74. The pole piece 130 extends longitudinally between a first end 132 that faces the head portion 78 of the valve member 74 and a second end 134 that abuts the inboard end 124 of the permanent magnet 122. The magnetic field of the permanent magnet 122 holds the permanent magnet 122 against the pole piece 130. As a result, contact between the second end 134 of the pole piece 130 and the inboard end 124 of the permanent magnet 122 remains constant during operation of the latching control valve assembly 20. In other words, the permanent magnet 122 does not move longitudinally relative to the pole piece 130 during operation of the latching control valve assembly 20. However, the permanent magnet 122 does move longitudinally with the pole piece 130 relative to the bobbin 26 when the longitudinal position of the pole piece 130 is adjusted in the manner explained below.

When the valve member 74 is in the first position (FIG. 4), the head portion 78 of the valve member 74 and the first end 132 of the pole piece 130 are longitudinally spaced from each other by a gap 136. When the valve member 74 is in the second position (FIG. 5), the head portion 78 of the valve member 74 moves into close proximity to the first end 132 of the pole piece 130 such that the gap 136 is minimized or reduced. The size of the gap 136 is critical to the performance of the solenoid 22. Adjustment of the pole piece 130 provided by the subject design advantageously allows the gap 136 to be set for optimal performance. The pole piece 130 is arranged in threaded engagement with the bobbin 26 to provide adjustable longitudinal positioning of the pole piece 130 relative to the head portion 78 of the valve member 74. The interior surface 36 of the bobbin 26 has female threads 138 while the pole piece 130 has male threads 140 adjacent the first end 132 of the pole piece 130. The male threads 140 of the pole piece 130 threadably engage the female threads 138 of the bobbin 26 such that relative rotation of the pole piece 130 within the solenoid bore 38 of the bobbin 26 longitudinally displaces the pole piece 130. Rotation of the pole piece 130 within the solenoid bore 38 of the bobbin 26 changes the gap 136 that exists between the head portion 78 of the valve member 74 and the first end 132 of the pole piece 130 when the valve member 74 is in the first position. To facilitate the adjustment of the longitudinal position of the pole piece 130 within the solenoid bore 38, the second end 134 of the pole piece 130 may optionally include a tool engagement interface 142. The pole piece 130 is made of a material that extends the magnetic field of the permanent magnet 122 to encompass at least a part of the head portion 78 of the valve member 74. By way of example and without limitation, the pole piece 130 may be made of a nickel plated AISI 12L14 carbon steel or AISI 430F stainless steel.

The attractive force 128 generated by the permanent magnet 122 has a variable magnitude (i.e. the strength and/or direction of the attractive force 128 that the permanent magnet 122 applies to the head portion 78 of the valve member 74 is changeable). In operation, the coil 28 of the solenoid 22 receives a pulse of electric current. The variable magnitude of the attractive force 128 generated by the permanent magnet 122 changes in response to the pulse and polarity of electric current passing through the coil 28 of the solenoid 22. Once the attractive force 128 of the permanent magnet 122 is increased (i.e., strengthened), by the pulse of electrical current through the coil 28, the increased magnitude of the attractive force 128 generated by the permanent magnet 122 will move the valve member 74 and position the head portion 78 into close proximity to the pole piece 132 reducing the gap 136 enough, that when the pulse of electrical current is stopped and the attractive force 128 is reduced, there is enough residual attractive force 128 from the permanent magnet 122 to maintain the valve member 74 in the second position. This residual attractive force 128 of the permanent magnet 122 can be reduced further by applying a pulse of electrical current in the reverse direction to the coil 28. The coercivity of the material forming the permanent magnet 122 must be such that the magnetic field of the material is responsive to the pulses of electric current sent through the coil 28 of the solenoid 22. Although several materials may be used for the permanent magnet 122, in one non-limiting example, the permanent magnet 122 is made of neodymium (Nd). As shown in FIGS. 4 and 5, the permanent magnet 122 in the illustrated example has a south pole 144 at the inboard end 124 and a north pole 146 at the outboard end 126. Alternatively, the south pole 144 of the permanent magnet 122 may be at the outboard end 126 and the north pole 146 may be at the inboard end 124, but such a modification would require associated changes to the direction in which the windings 42 are wound about the bobbin 26 and/or a control methodology of the pulses of electric current that is different than the control methodology presented below.

The attractive force 128 of the permanent magnet 122 displaces the valve member 74 towards the second position (FIG. 5) when the variable magnitude of the attractive force 128 is greater than the biasing force 120 of the biasing component 118. On the other hand, the biasing force 120 of the biasing component 118 displaces the valve member 74 towards the first position (FIG. 4) when the variable magnitude of the attractive force 128 is less than the biasing force 120 of the biasing component 118. In other words, permanent magnet 122 pulls (i.e. attracts) the valve member 74 towards itself, from the first position to the second position, when the attractive force 128 the permanent magnet 122 generates is strong enough to overcome the biasing force 120 of the biasing component 118. The biasing component 118 returns the valve member 74 to the first position when the attractive force 128 the permanent magnet 122 generates is weaker than the biasing force 120 of the biasing component 118. Whether the variable magnitude of the attractive force 128 is greater than or less than biasing force 120 depends on the polarity of the pulse of electric current through the coil 28 of the solenoid 22.

With reference to FIG. 3, the latching control valve assembly 20 may further include a control circuit 148 that is electrically connected to the at least two electrical connectors 52 by a first electrical lead 150 and a second electrical lead 152. The first and second electrical leads 150, 152 communicate electric current from the control circuit 148 to the two electrical connectors 52 and may take many forms, including without limitation, wires or conductive traces on a printed circuit board (PCB). The first electrical lead 150 is electrically connected to the first terminal 54 and the second electrical lead 152 is electrically connected to the second terminal 56. In operation, the control circuit 148 supplies one or more pulses of electric current to the coil 28 via the first and/or second electrical leads 150, 152. An exemplary operational control methodology is presented in Table I below:

TABLE I

| OPERATION | | | |
|---|---|---|---|
| | | FLOW PATH | |
| RED WIRE | BLACK WIRE | OPEN | CLOSED |
| +12 VDC | 0 VDC | 1-2 | 2-3 |
| 0 VDC | +12 VDC | 2-3 | 1-2 |

The column in Table I labeled "Red Wire" lists the voltage of the electric current that is supplied to the first electrical lead 150. The column in Table I labeled "Black Wire" lists the voltage of the electric current that is supplied to the second electrical lead 152. The column in Table I labeled "Flow Path Open" lists the ports between which a fluid flow path is present (i.e. is open) within the valve body bore 64 where "1" identifies the first port 96, "2" identifies the second port 98, "3" identifies the third port 100, "2-3" identifies the first fluid flow path 102, and "1-2" identifies the second fluid flow path 104. The column in Table I labeled "Flow Path Closed" lists the ports between which a fluid flow path is not present (i.e. is closed) within the valve body bore 64 where "1" identifies the first port 96, "2" identifies the second port 98, "3" identifies the third port 100, "2-3" identifies the first fluid flow path 102, and "1-2" identifies the second fluid flow path 104.

The top row (i.e. the first row) in Table I corresponds to an operational state where the valve member 74 is brought to and held in the second position (FIG. 5). In this operational state, the variable magnitude of the attractive force 128 of the permanent magnet 122 increases in response to the control circuit 148 supplying a positive voltage pulse of electric current to the first electrical lead 150 and zero volts to the second electrical lead 152. This increase in the variable magnitude of the attractive force 128 of the permanent magnet 122 causes the permanent magnet 122 to pull the valve member 74 from the first position to the second position and hold the valve member 74 in the second position against the biasing force 120 of the biasing component 118. In the second position, the seat engagement member 82 opens the second fluid flow path 104 between the first and second ports 96, 98 and closes the first fluid flow path 102 between the second and third ports 98, 100. As noted in Table I, the positive voltage pulse of electric current that is supplied to the first electrical lead 150 may be, for example, +12 volts direct current (VDC).

The bottom row (i.e. the second row) in Table I corresponds to an operational state where the valve member 74 is returned to the first position (FIG. 4). In this operational state, the variable magnitude of the attractive force 128 of the permanent magnet 122 decreases in response to the control circuit 148 supplying zero volts to the first electrical lead 150 and a positive voltage pulse of electric current to the second electrical lead 152. This decrease in the variable magnitude of the attractive force 128 of the permanent magnet 122 causes the valve member 74 to return to the first position as the variable magnitude of the attractive force 128 of the permanent magnet 122 falls below a magnitude of the biasing force 120 of the biasing component 118 (i.e. becomes weaker than the biasing force 120 of the biasing component 118). In the first position, the seat engagement member 82 opens the first fluid flow path 102 between the second and third ports 98, 100 and closes the second fluid flow path 104 between the first and second ports 96, 98. As noted in Table I, the positive voltage pulse of electric current that is supplied to the second electrical lead 152 may be, for example, +12 volts direct current (VDC). It should be appreciated that the variable magnitude of the attractive force 128 of the permanent magnet 122 remains constant when no electric current is supplied to the coil 28.

Except where certain materials for a particular component have been described, the components of the latching control valve assembly described above may be made of a variety of different materials, including without limitation, metals, metal alloys, and plastics. Obviously, many modifications and variations of the disclosed latching control valve assembly are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A latching control valve assembly comprising:
a solenoid including a housing, a bobbin disposed within said housing, and a coil extending around said bobbin;
said housing extending longitudinally between a first housing end and a second housing end;
said bobbin defining a solenoid bore that extends along a longitudinal axis;
a valve body extending longitudinally from said first housing end and defining a valve body bore;
at least one seat member disposed within said valve body bore;
a valve member having a head portion that is slidingly disposed within said solenoid bore and a valve portion that is slidingly disposed within said valve body bore;
said valve portion of said valve member having a seat engagement member that extends outwardly to engage said seat member during sliding motion of said valve member in said solenoid bore and said valve body bore between a first position where said seat engagement member is displaced away from said first housing end and a second position where said seat engagement member is displaced towards said first housing end;
said valve body including a ported face and said seat engagement member being operable to open and close one or more ports in said ported face of said valve body when said valve member translates longitudinally between said first and second positions;
a biasing component operable to apply a biasing force to said valve member that biases said valve member toward said first position;
a permanent magnet disposed at least partially within said solenoid bore that operably applies an attractive force to said valve member, said attractive force pointing towards said second housing end such that said attractive force of said permanent magnet opposes said biasing force of said biasing component;
a pole piece disposed within said solenoid bore that is positioned longitudinally between said permanent magnet and said head portion of said valve member;
a control circuit electrically connected to said coil and programmed to send pulses of electric current to said coil; and
said permanent magnet being made of a material with a coercivity that provides a magnetic field that is responsive to said pulses of electric current sent through said coil where said pulses of electric current alter a variable magnitude of said attractive force of said permanent magnet, said attractive force of said permanent magnet operably pulling said valve member towards said second position when said variable magnitude of said attractive force is greater than said biasing force of said biasing component and said biasing force of said biasing component operably pushing said valve member towards said first position when said variable magnitude of said attractive force is less than said biasing force of said biasing component.

2. The latching control valve assembly as set forth in claim 1 wherein said pole piece is arranged in threaded engagement with said bobbin to provide adjustable longitudinal positioning of said pole piece relative to said head portion of said valve member.

3. The latching control valve assembly as set forth in claim 2 wherein said permanent magnet extends longitudinally between an inboard end and an outboard end, said pole piece extends longitudinally between a first end that faces said head portion of said valve member and a second end that abuts said inboard end of said permanent magnet, said head portion of said valve member and said first end of said pole piece are longitudinally spaced from each other by a gap when said valve member is in said first position, and said head portion of said valve member abuts said first end of said pole piece when said valve member is in said second position such that said gap is eliminated when said valve member is in said second position.

4. The latching control valve assembly as set forth in claim 3 wherein said bobbin has an interior surface that defines said solenoid bore, said interior surface of said bobbin has female threads, and said pole piece has male threads adjacent said first end that threadably engage said female threads of said bobbin such that relative rotation of said pole piece within said solenoid bore longitudinally displaces said pole piece and changes said gap between said head portion of said valve member and said first end of said pole piece when said valve member is in said first position.

5. The latching control valve assembly as set forth in claim 4 wherein said second end of said pole piece includes a tool engagement interface.

6. The latching control valve assembly as set forth in claim 1, further comprising:
   at least two electrical connectors electrically connected to said coil; and
   a first electrical lead and a second electrical lead that electrically connect said control circuit to said first and second electrical connectors.

7. The latching control valve assembly as set forth in claim 6 wherein said permanent magnet extends longitudinally between an inboard end and an outboard end, has a south pole at said inboard end, and has a north pole at said outboard end.

8. The latching control valve assembly as set forth in claim 7 wherein said coil has windings that are wound in a clockwise direction about said bobbin when viewing said bobbin from a point disposed along said longitudinal axis adjacent said second housing end.

9. The latching control valve assembly as set forth in claim 8 wherein said variable magnitude of said attractive force of said permanent magnet increases in response to said control circuit supplying a positive voltage pulse of electric current to said first electrical lead and wherein said variable magnitude of said attractive force of said permanent magnet decreases in response to said control circuit supplying a positive voltage pulse of electric current to said second electrical lead.

10. The latching control valve assembly as set forth in claim 9 wherein said variable magnitude of said attractive force of said permanent magnet remains constant when no electric current is supplied to said coil.

11. The latching control valve assembly as set forth in claim 1 wherein said valve body extends between a proximal end and a distal end, said proximal end of said valve body is disposed adjacent said first housing end, and said distal end of said valve body is spaced away from said first housing end.

12. The latching control valve assembly as set forth in claim 11 wherein said valve body includes a first port extending through said valve body from said valve body bore to said ported face adjacent said distal end of said valve body, a second port extending through said valve body from said valve body bore to said ported face, and a third port extending through said valve body from said valve body bore to said ported face adjacent to said proximal end of said valve body such that said second port is disposed longitudinally between said first port and said third port.

13. The latching control valve assembly as set forth in claim 12 wherein said first port and said third port are disposed on opposite sides of said seat engagement member such that said seat engagement member contacts and seals against said seat member to close said first port and open said third port when said valve member is in said first position and such that said seat engagement member contacts and seals against said seat member to open said first port and close said third port when said valve member is in said second position.

14. The latching control valve assembly as set forth in claim 12 wherein said ported face of said valve body is configured to be received in a cavity of a valve manifold such that said first port operates as an inlet port, said second port operates as an outlet port, and said third port operates as an exhaust port.

15. The latching control valve assembly as set forth in claim 11 wherein said valve portion of said valve member has a first piston adjacent said distal end of said valve body and a second piston adjacent said proximal end of said valve body, said first and second pistons operating to seal against said valve body bore.

16. The latching control valve assembly as set forth in claim 15 wherein said first and second pistons and said seat member have substantially equal diameters such that a pressurized fluid acting oppositely against said first and second pistons and said seat member results in balanced pressure forces acting on said valve member.

17. The latching control valve assembly as set forth in claim 15, further comprising:
   a bushing disposed within said housing, said bushing including a flange portion and a neck portion that extends into said solenoid bore and is positioned radially between said head portion of said valve member and said bobbin, wherein said biasing component is positioned longitudinally between said second piston of said valve member and said flange of said bushing.

18. The latching control valve assembly as set forth in claim 1 wherein said bobbin has an interior surface that defines said solenoid bore, said head portion of said valve member is cylindrical in shape, said head portion of said valve member is arranged in a slip fit with said interior surface of said bobbin, and said biasing component is a compression spring that extends helically about said head portion of said valve member.

19. The latching control valve assembly as set forth in claim 1 wherein said valve member is a single-piece component where said head portion and said valve portion of said valve member are integral with each other.

20. The latching control valve assembly as set forth in claim 1 wherein said permanent magnet is made of neodymium.

* * * * *